United States Patent [19]

McAllister et al.

[11] Patent Number: 5,223,593
[45] Date of Patent: Jun. 29, 1993

[54] FLUORINE CONTAINING PLASTIC OPTICAL FIBER CORES

[75] Inventors: Jerome W. McAllister, Hudson, Wis.; Alastair S. Dodds, Harlow, England; Patricia M. Savu, Maplewood, Minn.; Nicholas A. Stacey, Great Dunmow; Rachel J. Hobson, Harlow, both of England

[73] Assignee: Minnesota Mining and Manufacturing Company, St. Paul, Minn.

[21] Appl. No.: 741,960

[22] Filed: Aug. 8, 1991

[51] Int. Cl.$^5$ .............................................. C08F 20/22
[52] U.S. Cl. .................................. 526/245; 526/224
[58] Field of Search ............................. 526/245, 224

[56] References Cited

U.S. PATENT DOCUMENTS

| | | |
|---|---|---|
| 3,062,765 | 11/1962 | Sherman et al. ............ 526/245 |
| 3,249,596 | 5/1966 | Pierce et al. ............... 526/245 |
| 4,043,965 | 8/1977 | Dickson .................... 526/245 |
| 4,500,694 | 2/1985 | Ohmori et al. . |
| 4,557,562 | 12/1985 | Ohmori et al. ............. 526/245 |
| 4,863,236 | 9/1989 | Herbrehtsmeier et al. ... 526/245 |
| 4,968,116 | 11/1990 | Hulme-Lowe et al. . |
| 5,129,031 | 7/1992 | Wieners et al. ............ 526/245 |

FOREIGN PATENT DOCUMENTS

| | | |
|---|---|---|
| 0250996A2 | 1/1988 | European Pat. Off. . |
| 0256765A1 | 2/1988 | European Pat. Off. . |
| 57-190902 | 11/1982 | Japan . |
| 60-191447 | 9/1985 | Japan .................... 526/245 |
| 60-258218 | 12/1985 | Japan . |
| 62-208005 | 9/1987 | Japan . |
| 2-187411 | 7/1990 | Japan .................... 526/245 |
| EP90/00585 | 11/1990 | PCT Int'l Appl. . |
| 1451143 | 1/1989 | U.S.S.R. ................. 526/245 |

OTHER PUBLICATIONS

Groh, "Overtone absorption in macromolecules for polymer optical fibers," *Makromol. Chem*, 189, 2861-2874 (1988).

EIA/TIA Standard-FOTP-78-Spectral-Attenuation Cutback Measurement for Single-Mode Optical Fibers (EIA/TIA-455-78A), May 1990.

T. Kaino, "Recent Development in Plastic Optical Fibers," in Frontiers of Macromolecular Science, edited by Saegusa et al., p. 475.

*Primary Examiner*—Joseph L. Schofer
*Assistant Examiner*—N. Sarofim
*Attorney, Agent, or Firm*—Gary L. Griswold; Walter N. Kirn; Carolyn V. Peters

[57] ABSTRACT

Polymer optical core fiber made from homopolymers of 1,1-dihydroperfluorocyclohexylmethyl methacrylate and co-polymers thereof with other $\beta$-fluorinated (meth)acrylates and polymethyl methacrylate are disclosed that have low optical loss.

8 Claims, No Drawings

FLUORINE CONTAINING PLASTIC OPTICAL FIBER CORES

BACKGROUND OF THE INVENTION

1. Field of the Invention

This invention relates to optical fibers and more particularly to optical fibers comprising a fluorine-containing core.

2. Description of the Related Art

Optical fibers have received widespread interest for information and data transfer. Fiber-guided modulated light beams are useful in many applications, for example, telecommunications, computer link-ups, and automotive controls. Advantageously, fiber optic linkages have a greater information carrying capacity as compared to metal wires carrying electrical signals. Furthermore, fiber optics are less likely to suffer from external interference, such as electromagnetic radiation.

Typically, optical fibers comprise a light carrying core, for example an inorganic glass such as fused silica or a polymer such as polymethyl methacrylate, and a cladding material having a lower refractive index than the core. The cladding material serves to confine the light energy within the core and thereby allows propagation of light by a phenomenon generally known as "total internal reflection."

Characteristically, glass optical fiber cores have very low optical loss and are generally preferred for long distance applications. On the other hand, the cost of connecting glass optical fiber cores tend to be cost prohibitive for short distance, connector intensive applications. Polymer fibers overcome the cost limitation for short distances. Furthermore, they are lighter weight, more flexible, and have a larger diameter than glass fibers. Although polymer fibers exhibit a greater optical loss than glass core fibers, they are preferred in shorter length applications. The most common commercial polymer optical fiber core material is polymethyl methacrylate (PMMA).

EPO 250,996 describes α- and β-fluorinated acrylates and methacrylates as cladding materials for glass core optical fibers.

EPO 256,765 describes α- and β-fluorinated acrylates and methacrylates as cladding for polymer core optical fibers.

T. Kaino, "Recent Development in Plastic Optical Fibers", in Frontiers of Macromolecular Science, edited by Saegusa et al, page 475, describes deuterated polymer optical fibers and deuterated-fluorinated polymer optical fibers. Deuteration, or deuterium substitution for some of the hydrogen atoms, is not cost effective, and the deuterated polymer is still subject to optical degradation as a function of increasing environmental humidity.

Makromol. Chem., 189, p2861, 1988, W. Groh, "Overtone Absorption in Macromolecules for Polymer Optical Fibers", a paper describing molecular bond absorption, concludes that perfluorinated polymers should show low optical loss.

Kokai No. JP60-258281 (English translation) describes optical lenses consisting of copolymers of at least one polymerizable compound containing polyfluoroalkyl methacrylates and non-fluorinated methacrylates.

Kokai No. JP57-190902 (English translation) describes optical fibers constructed of a core material of fluoroalkyl methacrylates, or copolymers of both fluorinated and non-fluorinated acrylates and methacrylates. The largest fluoroalkyl moiety disclosed was pentyl.

Japanese Patent No. 62-208005 (English translation) describes optical fibers formed from polymers expressed by the general formula

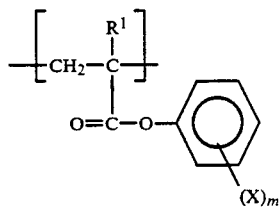

wherein $R^1$ is a hydrogen atom, or $C_{1-3}$ alkyl groups, X is a halogen atom and m is an integer of 1–5.

U.S. Pat. No. 4,500,694 describes optical fibers produced from fluoroalkyl acrylates and methacrylates with a fluorinated alkyl moiety of up to 3 carbon atoms, and copolymers of these fluoroalkyl groups with both fluorinated and non-fluorinated acrylates and methacrylates.

SUMMARY OF THE INVENTION

Briefly, one aspect of the present invention provides a plastic optical fiber core wherein the core is polymerized from monomers comprising (a) about 60% to 100% by weight of a polymerizable monomer having the formula

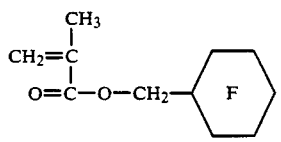

The "F" designation in the saturated ring indicates that the ring is fully fluorinated, that is all hydrogen atoms in the ring are substituted with fluorine atoms, and (b) about 60% to 0% by weight of a co-polymerizable monomer selected from the group consisting of 1,1-dihydroperfluorocyclohexylmethyl acrylate, methyl methacrylate, 1,1-dihydroperfluorooctyl methacrylate, 1,1-dihydroperfluoro(butoxy-2-propyl) methacrylate, and a mixture thereof.

In another aspect of the present invention, a process is provided for preparing the plastic optical fiber core of the present invention comprising the steps:

(a) admixing a polymerizable mixture comprising about 40% to 100% by weight of a fluorine-containing monomer having the formula

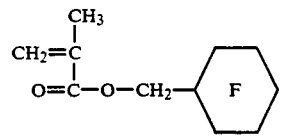

with about 60% to 0% by weight of a co-polymerizable monomer selected from the group consisting of 1,1-dihydroperfluorocyclohexylmethyl acrylate, methyl methacrylate, 1,1-dihydroperfluorooctyl methacrylate, 1,1-dihydroperfluoro(butoxy-2-propyl) methacrylate, and a mixture thereof;

(b) degassing the polymerizable mixture;

(c) isolating the polymerizable mixture in a closed reaction vessel;

(d) polymerizing the polymerizable mixture into a polymer; and (e) elevating the temperature of the polymer; and (f) extruding the polymer into a core fiber having a diameter in the range of 0.1–2.0 millimeters.

The present invention provides superior alternative formulations for polymer optical fibers.

In this application:

"α-fluorination" means the main chain of the polymer is fluorinated;

"β-fluorination" means the side chain of the polymer is fluorinated;

"PMMA" means polymethyl methacrylate;

"PcHMA" means 1,1-dihydroperfluorocyclohexylmethyl methacrylate;

"PcHA" means 1,1-dihydroperfluorocyclohexylmethyl acrylate;

"FOMA" means 1,1-dihydroperfluorooctyl methacrylate; and

"43MA" means 1,1-dihydroperfluoro(butoxy-2-propyl) methacrylate.

DESCRIPTION OF THE INVENTION

More specifically, the present invention describes a plastic optical fiber core wherein the core is polymerized from monomer comprising:

(a) about 40% to 100% by weight, preferably 50% to 90% by weight of a polymerizable monomer having the formula

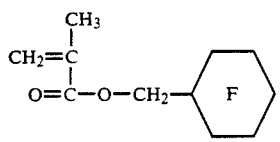

The "F" designation in the ring indicates that the ring is fully fluorinated, that is all hydrogen atoms in the ring are substituted with fluorine atoms, and (b) about 60% to 0% by weight, preferably 50% to 10 % by weight of a co-polymerizable monomer selected from the group consisting of 1,1-dihydroperfluorocyclohexylmethyl acrylate, methyl methacrylate,
1,1-dihydroperfluorooctyl methacrylate, 1,1-dihydroperfluoro(butoxy-2-propyl) methacrylate, and a mixture thereof.

The present invention satisfies the need for non-glass optical fibers operating in the near infrared region of the optical spectrum, preferably measured at 770 nanometers (nm) and 830 nm, and provides significant advances including reducing optical attenuation over existing commercial materials, such as polymethyl methacrylate (PMMA). For example, loss values of commercially available PMMA optical fibers are approximately 750 decibels per kilometers (dB/Km) and 1800 dB/Km at 770 nm and 830 nm, respectively.

At short wavelengths, that is, less than 600 nm, optical loss or attenuation is primarily due to Rayleigh scattering, which is inversely proportional to the fourth power of the wavelength. However, at wavelengths longer than 600 nm, optical attenuation within polymeric materials can be attributed primarily to absorptions due to carbon-hydrogen (C-H) vibrational overtones and combination bands associated with the overtones. The absorptions tend to occur periodically at whole number multiples of the fundamental stretching frequency over the 600–1500 nm range. There are absorption wavelength minima "windows" where the absorption is less than at nearby wavelengths.

By lowering the C-H bond density, relative to completely hydrogenated materials, such as PMMA, C-H vibrational band intensities can be reduced, which in turn lowers optical attenuation in the plastic optical fiber core. The plastic optical fiber cores of the present invention have a reduced C-H bond density, that is achieved by substituting fluorine atoms for hydrogen atoms in the polymer molecule. In the wavelength region of interest (600–1200 nm), the optical loss contribution is negligible from C-F bonds as compared to C-H bonds. It has been found that, it is particularly advantageous to fluorinate at the β sites on a polymerizable monomer, due to the ease of monomer preparation and fiber processing.

Generally, it has been found that optical loss is directly proportional to the monomer density times the number of C-H bonds in the monomer divided by the molecular weight of the monomer. For example, by fluorinating the monomer, the molecular weight of the monomer increases while the number of C-H bonds decreases, thereby causing optical loss to decrease.

It is also desirable to process the polymer as cleanly and precisely as possible, which not only means minimizing dirt contamination, but also reaction contaminants such as residual monomer or unreacted photoinitiator. It is also advantageous to pay particular attention to physical parameters, for example, maintaining a constant fiber diameter. The process of the present invention for producing plastic optical fiber cores minimizes these potential sources of loss.

In particular, the process of the present invention provides for preparing the plastic optical fiber core of the present invention comprising the steps:

(a) admixing a polymerizable mixture comprising about 40% to 100% by weight, preferably 50% to 90% by weight of a fluorine-containing monomer having the formula

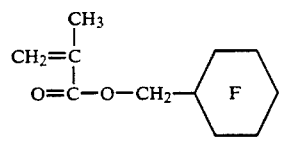

with about 60% to 0% by weight, preferably 50% to 10% by weight of a co-polymerizable monomer selected from the group consisting of 1,1-dihydroperfluorocyclohexylmethyl acrylate, methyl methacrylate,
1,1-dihydroperfluorooctyl methacrylate, 1,1-dihydroperfluoro(butoxy-2-propyl) methacrylate, and a mixture thereof, and about 0.001 to 2.0% by weight, preferably, 0.005 to 0.2% by weight of a free radical initiator and about 0.001 to 2.0% by weight, preferably 0.005 to 0.2% by weight of a chain transfer agent.

(b) degassing the polymerizable mixture;

(c) isolating the polymerizable mixture in a closed reaction vessel;

(d) polymerizing the polymerizable mixture into a polymer; and (e) elevating the temperature of the polymer; and (f) extruding the polymer into a core fiber having a diameter in the range of 0.1–2.0 millimeters.

β-fluorinated acrylates and methacrylates monomers used in the compositions of the invention have at least one polymerizable vinyl group. The fluorinated radical attached to the ester group is a perfluorocycloaliphatic group with 7 carbon atoms. The polymers comprising the plastic optical fiber cores of the present invention exhibit a lower optical absorption than PMMA preferably measured at 770 nm and 830 nm (near-infrared windows). Advantageously, the methacrylate polymer has a high glass transition temperature as a consequence of the perfluorocycloaliphatic group, which preferably has 7 carbon atoms, but could also contain 6 or 8 carbon atoms, combined with optical clarity and colorlessness. Plastic optical fiber cores are preferably produced from amorphous polymers because semicrystalline polymers tend not to have adequate clarity. The upper use temperature of the plastic optical fiber cores made from an amorphous polymer is determined by the glass transition temperature, typically greater than 50° C. Color in a polymer results from electronic transitions, and in order for a polymer to function as an optical fiber, it is preferred that these be neglible in the visible wavelength region.

Fluoropolymers with fluorine atoms in the β, position only, tend to be more resistant to degradation during processing than are those that are completely fluorinated. As a result, they have a tendency to result in plastic optical fiber cores with improved optical clarity. Typically, the plastic optical fiber core is prepared from a homopolymer or co-polymer that has an average molecular weight ($MW_{avg}$) less than 1,000,000, and a glass transition temperature ($T_g$) greater than 50° C.

While fluorinated homopolymers are useful for preparing the plastic optical fiber cores of the present invention, it is often desirable to make co-polymers of these molecules with each other or with MMA. Generally, fluorinated polyacrylates have a low $T_g$ and the fluorinated polymethacrylates are generally brittle. Through copolymerization, the properties of the final optical fiber core can be tailored as desired.

Suitable free-radical initiators that are useful in the present invention include, for example, azo initiators, such as, azo bis-iso-butyronitrile, and azo t-butane; peroxides, such as, t-butyl hydroperoxide and di-t-butyl peroxide; or any other free radical initiator that is known to those skilled in the art.

Suitable chain transfer agents, include for example, alkyl thiols, such as, n-butane thiol, t-butyl thiol; aromatic thiols, such as thiophenol; or any other free radical initiator that is known to those skilled in the art.

In general suitable plastic optical fiber core compositions of the present invention have the following formulation:

(a) 40–100% by weight, preferably 50–90% by weight, of 1,1-dihydroperfluorocyclohexylmethyl methacrylate;

(b) 0–60% by weight, preferably 10–50% by weight, of a co-polymerizable monomer, wherein the co-polymerizable monomer is at least one of 1,1-dihydroperfluorocyclohexylmethyl acrylate, methyl methacrylate, 1,1-dihydroperfluorooctyl methacrylate, 1,1-dihydroperfluoro(butoxy-2-propyl) methacrylate, and a mixture thereof;

(c) 0.001–2.0% by weight, preferably 0.005–0.2% by weight of a free radical initiator; and (d) 0.001–2.0% by weight, preferably 0.005–0.2% by weight of a chain transfer agent.

The plastic optical fiber cores of the present invention can be coated with a polymeric cladding, as is known in the art, such as PCT/EP9/00585 (Blickle et al.) provided the cladding has a refractive index of least 0.01 less than that of the core.

The optical fibers prepared using the plastic optical fiber core of the present invention may also be coated with a protective coating over the polymeric cladding, as is known in the art. See, for example, U.S. Pat. No. 4,968,116, wherein a protective coating of polyethylene, may be extrusion coated by passing the clad fiber through a melt of the polyethylene.

Objects and advantages of this invention are further illustrated by the following examples, but the particular materials and amounts thereof recited in these examples, as well as other conditions and details, should not be construed to unduly limit this invention. In the examples, all parts are parts by weight unless otherwise indicated. Molecular weight and polydispersity were measured by gel permeation chromatography. The plastic optical fiber cores were analyzed for optical attenuation across a range of wavelengths using the fiber-cut back procedure described in FOTP-78 (ANSI/EIA/TIA Standard, Spectral-Attenuation Cutback Measurements for Single-Mode Optical Fibers, EIA/TIA-455-78A, May 1990).

EXAMPLES

Preparation Example 1

Preparation of 1,1-dihydroperfluorocyclohexylmethyl methacrylate

A 3 liter round-bottomed flask, fitted with an overhead stirrer and dropping funnel, contained 840 grams of trifluoroacetic anhydride (Aldrich Chemical Co., Milwaukee, Wis.). The flask was immersed into an ice-water bath (<5° C.). 380 grams of methacrylic acid (Aldrich Chemical Co.) was added to the flask over a period of 10 minutes. The reaction was then stirred for approximately 30 minutes at ice-water temperature. The cooled reaction mixture was then charged with 1000 grams of perfluorocyclohexylmethylol from (Minnesota Mining and Manufacturing Co., St. Paul, Minn.). The mixture was stirred at ice-water temperature for approximately 30 minutes and then approximately for 16 hours at room temperature.

Crude product was isolated by adding the reaction mixture to 1 liter of water cooled to <5° C. by immersion in an ice-water bath. The resulting two phases (aqueous and organic) were separated. The organic phase was washed twice with 500 ml of water, twice with 500 ml of 0.2N sodium hydroxide, and then with 500 ml of saturated sodium chloride solution. The washed organic phase was dried over magnesium sulfate.

The dried residue containing crude, fluorinated monomer product was purified by column chromatography using silica gel (Keiselgel TM 60, Merck, Poole, England) as the stationary phase and 5% diethyl ether in 30°–40° C. petroleum ether as eluent. The solvents were removed under reduced pressure and the crude fluorinated monomer was vacuum distilled at 9 mm Hg to leave pure 1,1-dihydroperfluorocyclohexylmethyl methacrylate, which was stored at 5° C. prior to use.

Preparation Example 2

Preparation of 1,1-dihydroperfluorocyclohexylmethyl acrylate 1,1-dihydroperfluorocyclohexylmethyl acrylate was prepared and purified in a similar manner to 1,1,-dihydroperfluorocyclohexylmethyl methacrylate as described in Preparation Example 1 with acrylic acid being used in place of methacrylic acid. The pure monomer was distilled at 8 mm Hg.

Preparation Example 3

Preparation of Methyl Methacrylate

Methyl methacrylate (Fisons, Loughborough, England) was purified by column chromatography using basic alumina as the stationary phase. The monomer was then stored over calcium hydride at 5° C. for at least 48 hours prior to filtration and distillation at 152 mm Hg.

Preparation Example 4

Preparation of 1,1-dihydroperfluorooctyl methacrylate 100 grams of trifluoroacetic anhydride was placed in a 500 ml round bottom flask, fitted with a magnetic stirrer, thermometer, and dropping funnel. The flask was cooled in an ice water bath to less than 5° C. and 45 grams of methacrylic acid was added over a period of 10 minutes. On complete addition, the flask was stirred for a further 30 minutes at 0°-5° C., before addition of 153 grams of 1,1-dihydroperfluorooctyl alcohol (Minnesota Mining and Manufacturing Co., St. Paul, Minn.). The reaction mixture was allowed to stir for 30 minutes at 0°-5° C. and then at room temperature for 16 hours. Isolation of the crude product was achieved by addition of the reaction mixture to 400 ml of water, cooled to less than 5° C. by immersion in an ice water bath. The two phases were separated and the organic phase was further washed twice with 200 ml of water, twice with 200 ml of 0.2N sodium hydroxide, with 200 ml of water and 200 ml of saturated sodium chloride solution, and then dried over magnesium sulfate.

The dried residue containing crude, fluorinated monomer product was purified by column chromatography using silica gel (Keiselgel TM, Merck, Poole, England) as the stationary phase and 5% ether in petroleum ether as eluent. The solvents were removed under reduced pressure and the crude fluorinated monomer was distilled at 9 mm Hg to leave 1,1-dihydroperfluorooctyl methacrylate (FOMA), which was stored at 5° C. until use.

Preparation Example 5

Preparation of 1,1-dihydroperfluoro(butoxy-2-propyl) methacrylate

To a 1000 ml round bottom flask, fitted with a magnetic stirrer, thermometer and dropping funnel, was added 289 grams of trifluoroacetic anhydride. The flask was cooled in an ice water bath to less than 5° C. and 124 grams of methacrylic acid was added over a period of 10 minutes. On complete addition, the flask was stirred for an additional 30 minutes at 0°-5° C. before addition of 481 grams of 1,1-dihydroperfluoro-2-butoxypropanol (Minnesota Mining and Manufacturing Co.). The reaction mixture was allowed to stir for 30 minutes at 0°-5° C. and then at room temperature for 16 hours. Isolation of the crude product was achieved by addition of the reaction mixture to 400 ml of water, cooled to less than 5° C. by immersion in an ice water bath. The two phases were separated and the organic phase was further washed twice with 600 ml water, twice with 600 ml of 0.2N sodium hydroxide, with 600 ml water and 400 ml saturated sodium chloride solution, and then dried over magnesium sulfate.

The dried residue containing crude, fluorinated monomer product was purified by column chromatography using silica gel (Keiselgel TM, Merck, Poole, England) as the stationary phase and 5 percent ether in petroleum ether as eluent. The solvents were removed under reduced pressure and the crude, fluorinated monomer was vacuum distilled to leave pure 1,1-dihydroperfluoro(butoxy-2-propyl) methacrylate (43MA), which was stored at 5° C. until use.

OPTICAL FIBER PREPARATION METHODS

Preparation of Polymerization Vessels

Polymerization of the monomers or co-monomers was carried out in 11 mm diameter by 350 mm long thick walled glass tubes containing a vacuum attachment joint and fitted with a polytetrafluoroethylene (PTFE) stopcock to seal the tube contents during polymerization, and a 7 mm diameter by 30 mm long capillary at the tube base. The tubes were prepared before use by initially filling with cleaning fluid (Decon 90 TM Merck, Poole, England) diluted approximately 10:1 with water. The tubes were then sonicated for approximately 30 minutes at 50° C. before rinsing with 0.1 ml of hydrochloric acid and then distilled deionized water. Finally, the tubes were rinsed with 0.2 μm filtered acetone and dried thoroughly prior to use.

Plastic Optical Fiber Core Formation

After polymerization, plastic optical fiber core extrusion was accomplished by heating the polymerization vessel to process temperature (130° C.-260° C.). This was followed by extruding the polymer under a measured and controllable pressure of nitrogen through an approximately 2 cm long die tip formed by cutting the glass capillary at the base of the polymerization vessel. The resulting fiber core, having an approximately 0.5 mm diameter, was drawn down using a motor driven 30 cm diameter plastic drum.

Under normal use conditions, the optical core fibers are clad with a polymeric material with a refractive index of less than that of the core. For the examples to follow, loss values were measured without claddings applied to the cores, utilizing the refractive index of air at 1.0 to achieve total internal reflection.

EXAMPLE 1

An optical core fiber comprising 70:30% by weight of 1,1-dihydroperfluorocyclohexylmethyl methacrylate and methyl methacrylate copolymer was prepared as follows:

37.1 grams of 1,1-dihydroperfluorocyclohexylmethyl methacrylate monomer (as prepared in Preparation Example 1) was added to a cleaned polymerization vessel by syringe through a 0.02 μm filter (Anotech Ltd., Banbury, England). 26 μl of t-butyl hydroperoxide (a polymerization initiator) and 56 μl of n-butanethiol (a molecular weight modifier) were added to the polymerization vessel by microsyringe. This was followed by rapid addition of 15.9 grams of methyl methacrylate by syringe through a 0.02 μm filter. The polymerization vessel was then attached to a standard vacuum line, and the contents thoroughly degassed using freeze-thaw techniques. The vessel was then refrozen and evacuated to below 0.05 mm Hg before sealing the neck of the polymerization vessel with a PTFE stopcock, isolating the vessel and the contents from the vacuum line. After warming the contents of the polymerization vessel to room temperature, polymerization was carried out by immersing the vessel into a controlled temperature silicone oil bath heated to 140° C. for 15 hours, followed by successive dwells at 160° C. for 4 hours and 180° C. for 4 hours. The vessel was heated to 195° C. and the polymer was extruded under nitrogen pressure at a rate of 2 m/min for a plastic optical fiber core with approximately 0.5 mm diameter. After extruding the plastic optical fiber core, the polymer was analyzed and was found to have an average molecular weight ($MW_{avg}$) of 92,700, and a $T_g$ of 93° C.

The plastic optical fiber core was analyzed for its optical attenuation across a range of wavelengths (550–850 nm) using a Bentham Model M300EA monochromator and a fiber cut-back procedure (FOTP-78 cutback method). The optical loss spectrum of the plastic optical fiber core was measured using the Bentham and adjusted to the value measured at 633 nm with a He-Ne laser, also using the fiber cut back procedure. The measured loss of the plastic optical fiber core was found to be 265 dB/Km at 765 nm and 825 dB/Km at 830 nm.

EXAMPLE 2

An optical fiber comprising a 70:30 percent by weight of 1,1-dihydroperfluorocyclohexylmethyl methacrylate and 1,1-dihydroperfluorocyclohexylmethyl acrylate was prepared as follows:

45.7 grams of 1,1-dihydroperfluorocyclohexylmethyl methacrylate monomer (as prepared in Preparation Example 1) was added to a cleaned polymerization vessel by syringe through a 0.02 μm filter. 17 μl of t-butyl hydroperoxide (polymerization initiator) and 37 μl of n-butanethiol (a molecular weight modifier) were added to the vessel by microsyringe. 19.6 grams of 1,1-dihydroperfluorocyclohexylmethyl acrylate (as prepared in Preparation Example 2) was also added by syringe, through a 0.02 μm filter. The vessel was attached to a standard vacuum line and the contents were thoroughly degassed by standard freeze-thaw procedures. After refreezing and evacuation of the vessel to below 0.05 mm Hg pressure, the polymerization vessel neck was sealed using a PTFE tap to isolate the polymerization vessel from the vacuum line. After warming the vessel to room temperature, polymerization was carried out by immersion of the vessel into a temperature controlled silicone oil bath heated to 140° C. for 16 hours, followed by successive dwells at 160° C. for 4 hours and 180° C. for 4 hours. The polymer was then allowed to cool to 140° C. Subsequent to extrusion, the polymer was analyzed and was found to have a $MW_{avg}$ of 178,470, and a $T_g$ of 67° C.

Nitrogen was admitted to the polymerization vessel and the bottom of the vessel was cut to form a die tip. Optical core fiber was then extruded at 144° C., to produce an optical core fiber with a diameter of approximately 0.5 mm.

The plastic optical fiber core was analyzed for its optical attenuation across a range of wavelengths as described in Example 1, resulting in a measured optical core fiber loss of 229 dB/Km at 765 nm and 504 dB/Km at 830 nm.

EXAMPLE 3

A 70:30 percent by weight copolymer of PcHMA:4-3MA was prepared as in Example 1 except for the following details: 40.8 grams of PCHMA and 17.5 grams of 43MA were polymerized with 15 μl of t-butyl hydroperoxide and 23 μl butanethiol, using a polymerization profile of 140° C. for 16 hours, and 160° C. for 4 hours. The tube was transferred to the tower, cooled to 135° C. and the tip was broken off. The polymer was heated to 150° C., where approximately 30 m of 0.65 mm diameter fiber was produced at 18 m/min. The polymer had a $MW_{avg}$ of 557,066, and a $T_g$ of 59° C. The fiber was analyzed for its optical attenuation across a range of wavelengths as in Example 1, resulting in a measured fiber loss of 384 dB/Km at 765 nm and 635 dB/Km at 830 nm.

EXAMPLE 4

A 70:30 percent by weight copolymer of PcHMA:-FOMA was prepared as in Example 1, except for the following details: 42.3 grams of PcHMA and 18.1 grams of FOMA were polymerized with 15 μl t-butyl hydroperoxide and 23 μl butanethiol using a temperature profile of 140° C. for 16 hours and then 160° C. for 4 hours. After transferring to the tower and cooling to 140° C., the tip was broken off, and the polymer heated to 190° C., where approximately 40 m of 0.6 mm diameter fiber was produced at 5 m/min. The polymer had a $MW_{avg}$ of 662,878, and a $T_g$ of 58° C. The fiber was analyzed for its optical attenuation across a range of wavelengths as in Example 1, resulting in a measured fiber loss of 484 dB/Km at 765 nm and 740 dB/Km at 830 nm.

EXAMPLE 5

A PcHMA homopolymer was prepared as in Example 1, except for the following details: 60.1 grams PcHMA was polymerized with 15 μl t-butyl hydroperoxide and 23 μl butanethiol using a temperature profile of 140° C. for 16 hours and then 160° C. for 4 hours. After transferring to the tower, and cooling to 140° C., the tip was broken off, and the polymer heated to 190° C. where approximately 40 m of 0.6 mm diameter fiber was produced at 4.4 m/min. The polymer had a $MW_{avg}$ of 501,370, and a $T_g$ of 97° C. The fiber was analyzed for its optical attenuation across a range of wavelengths as in Example 1, resulting in a measured fiber loss of 503 dB/Km at 765 nm and 791 dB/Km at 830 nm.

Various modifications and alterations of this invention will be become apparent to those skilled in the art without departing from the scope and principles of this invention, and it should be understood that this invention is not to be unduly limited to the illustrative embodiments set forth hereinabove.

We claim:

1. A transparent plastic fiber core having an optical attenuation less than 750 dB/Km at 770 nm and 1800 dB/Km at 830 nm prepared from a polymerizable mixture comprising:
   (a) 40% by weight to 100% by weight of 1,1-dihydroperfluorocyclohexylmethyl methacrylate;
   (b) 60% by weight to 0% by weight of a co-polymerizable monomer, wherein said co-polymerizable monomer is selected from the group consisting of 1,1-dihydroperfluorocyclohexylmethyl acrylate, methyl methacrylate, 1,1-dihydroperfluorooctyl methacrylate, 1,1-dihydroperfluoro(butoxy-2-propyl) methacrylate, and mixtures thereof;

(c) 0.001% by weight to 2.0% by weight of a free radical initiator, and (d) 0.001% by weight to 2.0% by weight of a chain transfer agent.

2. The plastic optical fiber core according to claim 1, wherein said core comprises:

(a) at least 60% by weight of 1,1-dihydroperfluorocyclohexylmethyl methacrylate monomer, and (b) up to 40% by weight of methyl methacrylate monomer.

3. The plastic optical fiber core according to claim 1, wherein said core has an average molecular weight less than 1,000,000 and a glass transition temperature greater than 50° C.

4. The plastic optical fiber core according to claim 1, wherein said monomer is 100% by weight of 1,1-dihydroperfluorocyclohexylmethyl methacrylate.

5. The plastic optical fiber core according to claim 1, wherein said monomer is 1,1-dihydroperfluorocyclohexylmethyl methacrylate and said co-polymerizable monomer is 1,1-dihydroperfluoro(butoxy-2-propyl)-methacrylate.

6. The plastic optical fiber core according to claim 1, wherein said monomer is 1,1-dihydroperfluorocyclohexylmethyl methacrylate and said co-polymerizable monomer is 1,1-dihydroperfluorocyclohexylmethyl acrylate.

7. The plastic optical fiber core according to claim 1, wherein said monomer is 1,1-dihydroperfluorocyclohexylmethyl methacrylate and said co-polymerizable monomer is 1,1-dihydroperfluorooctyl methacrylate.

8. A transparent plastic fiber core having an optical attenuation less than 750 dB/Km at 770 nm and 1800 dB/Km at 830 nm prepared from a polymerizable mixture comprising:

(a) 40% by weight to 100% by weight of 1;1-dihydroperfluorocyclohexylmethyl methacrylate;

(b) 60% by weight to 0% by weight of a co-polymerizable monomer, wherein said co-polymerizable monomer is selected from the group consisting of 1,1-dihydroperfluorocyclohexylmethyl acrylate, methyl methacrylate, 1,1-dihydroperfluorooctyl methacrylate, 1,1-dihyroperfluoro(butoxy-2-propyl) methacrylate, and mixture thereof;

(c) 0.001% by weight to 2.0% by weight of t-butyl hydroperoxide, a free radical initiator, and (d) 0.001% by weight to 2.0% by weight of n-butanol thiol, a chain transfer agent.

* * * * *